United States Patent [19]
Dolan

[11] Patent Number: 5,934,449
[45] Date of Patent: Aug. 10, 1999

[54] TRANSFER CONVEYOR

[76] Inventor: Rex H. Dolan, P.O. Box 528, Carthage, Miss. 39061

[21] Appl. No.: 09/246,930

[22] Filed: Feb. 9, 1999

Related U.S. Application Data

[62] Division of application No. 08/813,840, Mar. 6, 1997.
[51] Int. Cl.⁶ ............................ B65G 23/44; B65G 17/06
[52] U.S. Cl. ........................... 198/853; 198/814; 198/806
[58] Field of Search ..................................... 198/812, 813, 198/814, 806, 807, 631.1, 860.1, 861.1

[56] References Cited

U.S. PATENT DOCUMENTS

| | | | |
|---|---|---|---|
| 2,564,090 | 8/1951 | Ziemann | 198/814 |
| 2,578,871 | 12/1951 | Woldring | 198/814 |
| 3,180,475 | 4/1965 | Del Rosso | 198/850 |
| 3,474,893 | 10/1969 | Morine | 198/813 |
| 3,718,197 | 2/1973 | Barten et al. | 198/814 |
| 3,934,706 | 1/1976 | Tice | 198/454 |
| 4,369,617 | 1/1983 | Hanaway et al. | 198/814 |
| 4,421,228 | 12/1983 | Marsiglio et al. | 198/814 |
| 5,141,099 | 8/1992 | Baumgartner | 198/852 |
| 5,143,200 | 9/1992 | Fuller | 198/453 |
| 5,174,435 | 12/1992 | Dorner et al. | 198/813 |
| 5,213,322 | 5/1993 | Matsuo et al. | 198/814 |
| 5,307,923 | 5/1994 | Damkjaer | 198/852 |
| 5,743,378 | 4/1998 | Hovstoet et al. | 198/806 |

*Primary Examiner*—James W. Keenan
*Assistant Examiner*—Thuy V. Tran
*Attorney, Agent, or Firm*—Brady, O'Boyle & Gates

[57] ABSTRACT

A transfer conveyor having a frame assembly in which a large diameter drive roller is mounted together with tension rollers. A pair of small diameter nose bars are mounted on each end of the frame assembly, and an endless conveyor belt of fabric or plastic chain is looped around the drive roller, tension rollers, and nose bars. A quick release tension mechanism is operatively connected between the frame assembly and one of the tension rollers, whereby the belt can be removed from the rollers and nose bars without the use of any special tools. A lateral adjustment mechanism is operatively connected between the frame assembly and upper run of the endless conveyor belt, whereby the transfer belt can be maintained in alignment with two other conveyors between which the transfer conveyor is interposed, and a quick disconnect mechanism is also provided for releasing the transfer conveyor from a base support.

8 Claims, 5 Drawing Sheets

TRANSFER CONVEYOR

This application is a division of application Ser. No. 08/813,840, filed Mar. 6, 1997.

BACKGROUND OF THE INVENTION

Heretofore, when transferring products, such as cans of food from one endless conveyor to another, a fixed, flat metal plate has been provided to fill the gap between the discharge end of one conveyor and the infeed end of the other conveyor. This method of transfer is commonly known as "marshalling a product", wherein cans of food conveyed from the discharge end of one conveyor abut previously conveyed cans on the metal plate. These cans are eventually pushed across the fixed plate until pulled away from the plate by the infeed end of the other conveyor. While this type of transfer method might be acceptable for packaged products, it is not satisfactory for the transfer of unpackaged food products such as crackers, cookies, and cakes which require a smooth, continuous, uninterrupted transfer from one endless conveyor to another.

After considerable research and experimentation, the transfer conveyor of the present invention has been devised for use particularly in the food industry for transferring unpackaged products from one conveyor to another and which is also constructed and arranged to be quickly and easily disassembled for cleaning or the replacement of a conveyor belt.

SUMMARY OF THE INVENTION

The transfer conveyor of the present invention comprises, essentially, a frame assembly in which a large diameter drive roller is mounted together with tension rollers. A pair of small diameter nose bars are mounted on each end of the frame assembly, and an endless conveyor belt of fabric or plastic chain is looped around the drive roller, tension rollers, and nose bars.

A quick release tension mechanism is operatively connected between the frame assembly and one of the tension rollers, whereby the belt can be removed from the rollers and nose bars without the use of any special tools.

A lateral adjustment mechanism is operatively connected between the frame assembly and upper run of the endless conveyor belt, whereby the transfer belt can be maintained in alignment with the other two conveyors between which the transfer conveyor is interposed.

A quick disconnect mechanism is also provided for releasing the transfer conveyor from a base support.

The construction and arrangement of the plastic chain conveyor of the present invention is such that it can be used on smooth surfaced drive rollers; thus, not requiring a sprocket drive.

DESCRIPTION OF THE PREFERRED EMBODIMENTS

Figure 1:
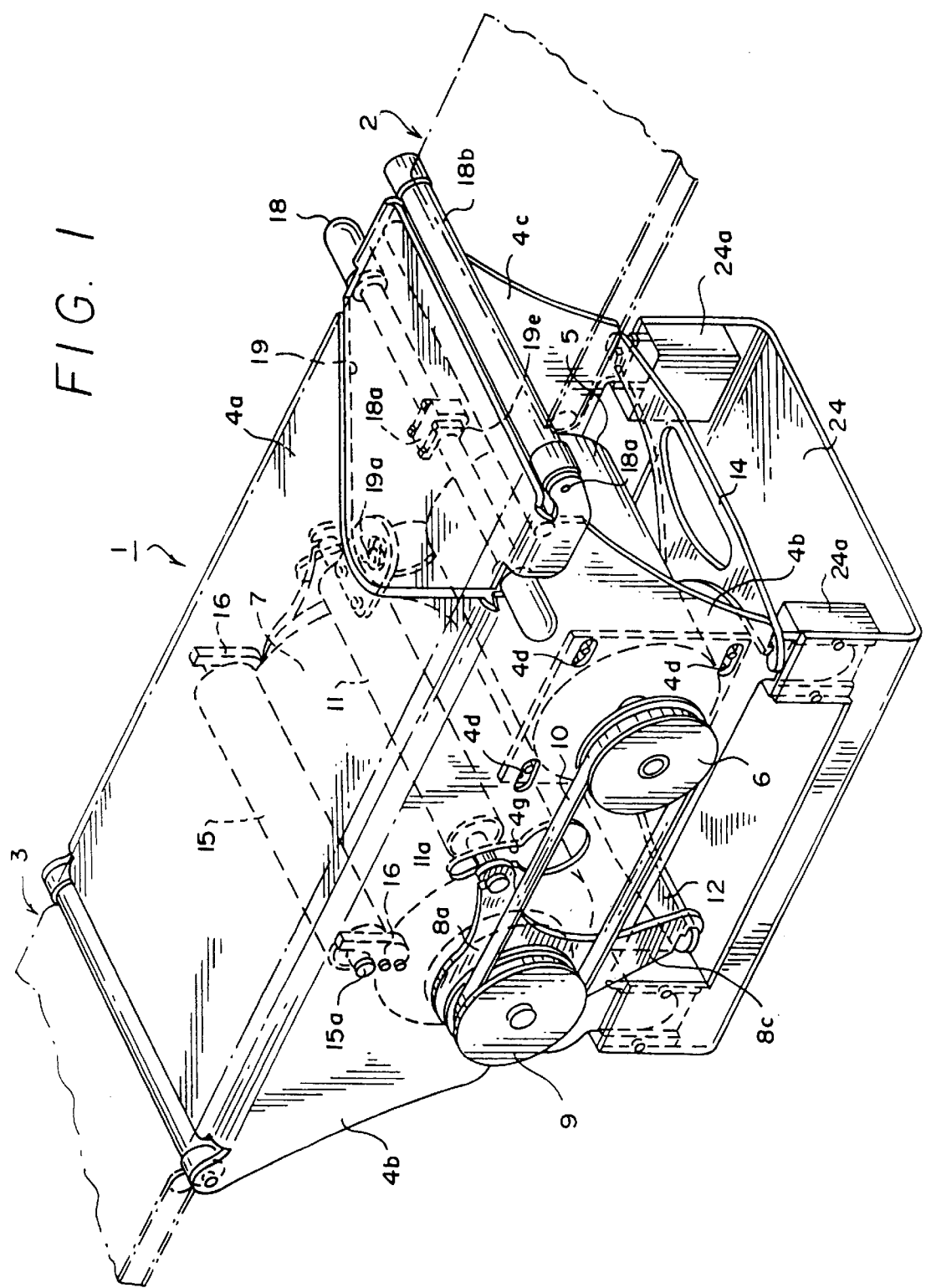
FIG. 1 is a perspective view of the transfer conveyor of the present invention.

Referring to the drawings and, more particularly to FIG. 1, the transfer conveyor of the present invention is adapted to be positioned in the gap between the discharge end of one conveyor 2 and the infeed end of another conveyor 3. This type of transfer conveyor is readily usable in the food industry for the smooth, continuous, uninterrupted transfer of unpackaged food products from conveyor 2 to conveyor 3.

Figure 2:
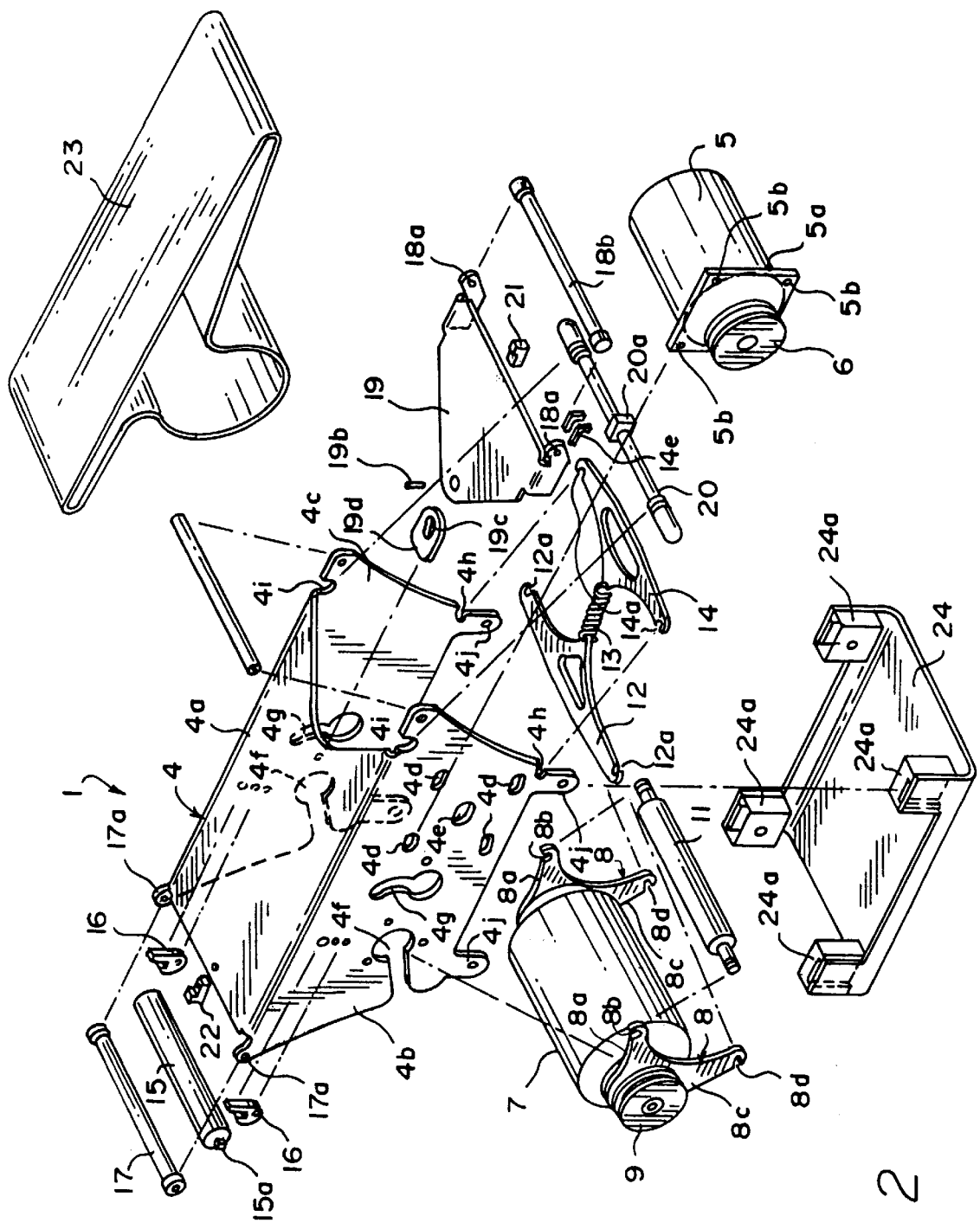
FIG. 2 is an exploded view of the transfer conveyor shown in FIG. 1.
Figure 3:
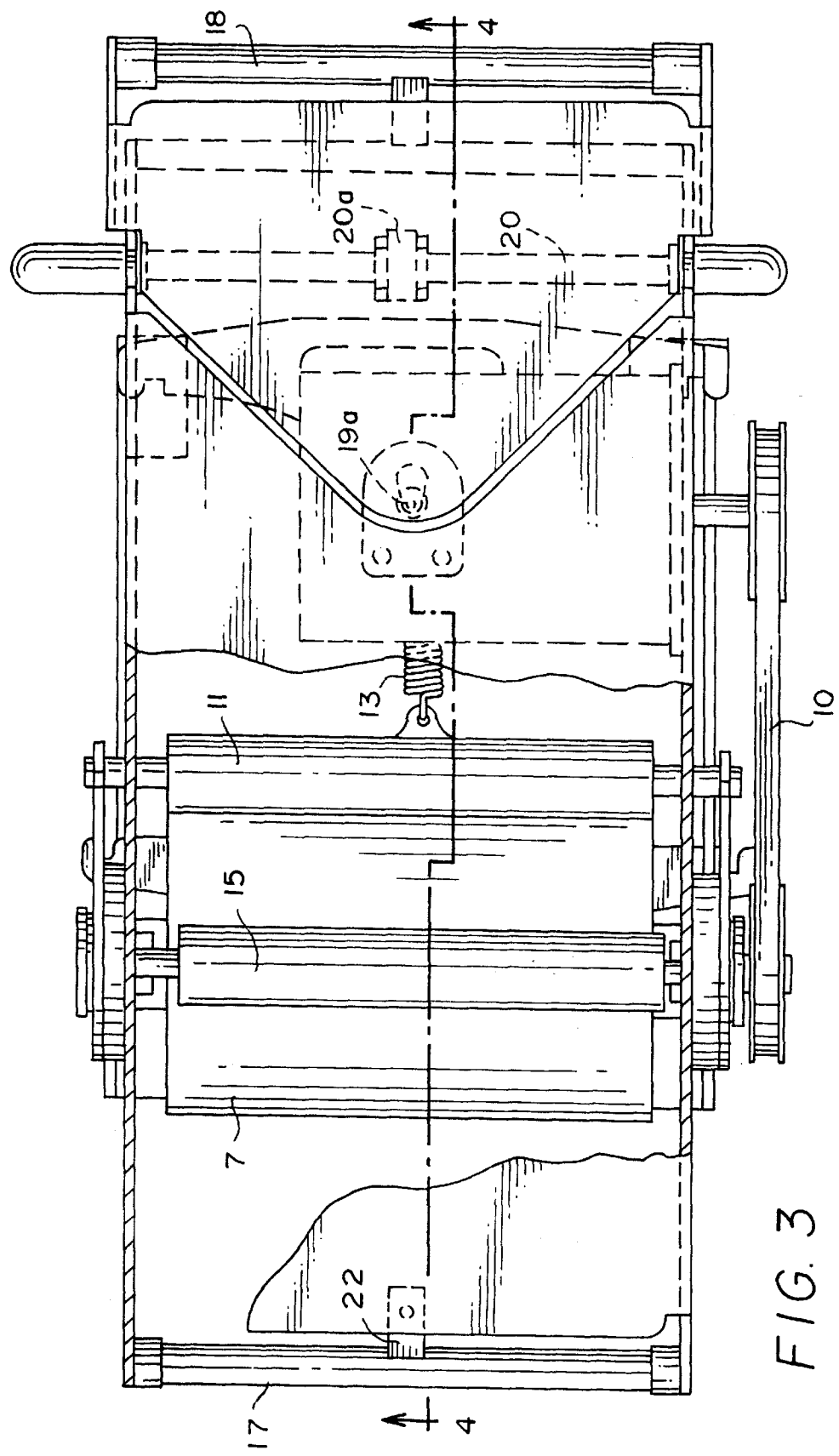
FIG. 3 is a fragmentary, top plan view, partially in section, of the transfer conveyor.

The details of the construction of the transfer conveyor 1 are shown in FIGS. 1 and 2, wherein it will be seen that a frame assembly 4 including a bent metal plate having a top wall 4a and depending side walls 4b and 4c forms a housing for an electric motor 5 having a mounting plate 5a secured to the inner surface of side wall 4b by suitable fasteners (not shown) extending through aperture 4d in the side wall aligned with aperture 5b in the mounting plate 5a. An aperture 4e is also provided in the side wall 4b through which the shaft of the motor 5 extends to which a pulley 6 is secured.

A large diameter drive roller 7 is also housed within the frame assembly 4 and is mounted therein by the shaft (not shown) of the roller 7 extending through aligned keyhole slots 4f provided in side walls 4b and 4c. A pair of bifurcated arm members 8 are pivotally mounted on the roller shaft at each end of the roller 7, and a pulley 9 is connected to the end of the roller shaft adjacent the outer surface of the side wall 4b. A drive belt 10 extends between the drive pulley 6 and drive pulley 9 for driving the roller 7.

Each bifurcated arm member 8 includes a leg portion 8a provided with a cradle 8b at the outer end thereof, and a finger portion 8c having a hook 8d at the outer end thereof. A first idler roller 11 having a shaft 11a is supported on the leg portions 8a by inserting the opposite end portions of the shaft 11a into the cradles 8b. The ends of the shaft 11a extend through arcuate slots 4g provided in the side walls 4b and 4c.

The hooks 8d on the finger portions 8c are adapted to be engaged by a transverse arm 12 having correspondingly shaped hook portions 12a. A tension spring 13 is connected between the arm 12 and another transverse arm 14 having hook portions 14a adapted to engage within slots 4h provided in the edges of side walls 4b and 4c.

A second idler roller 15 is positioned above the drive roller 7 and is mounted within the frame assembly 4 by a pair of cradles 16 fixedly mounted to the inner surfaces of the side walls 4b and 4c and adapted to receive the end portions of the roller shaft 15a.

A first small diameter nose bar 17 is mounted as at 17a to the side walls 4b and 4c at one end of the frame assembly, and a second small diameter nose bar 18 is mounted as at 18a to a movable plate member 19 having its lateral edges supported by the top edges of the side walls 4b and 4c, and being pivotally connected as at 19a by a pin 19b extending through the plate member 19 and an elongated aperture 19c in a plate 19d fixedly connected to the top wall 4a of the frame assembly 4.

A transversely extending adjustable screw shaft assembly 20 is positioned underneath the plate member 19 and is supported at each end thereof in notches 4i provided in the upper edges of the side walls 4b and 4c. A nut 20a is threadably mounted of the screw shaft 20 and is movable thereon when the shaft is manually turned. A depending saddle 19e is fixedly secured to the lower surface of the plate member 19 and straddles the nut 20a, whereby rotation of the shaft in one direction or the other will pivot plate member 19 in a lateral direction.

A bearing block 21 is mounted in the outer edge of plate 19 and engages the medial portion of the nose bar 18 to prevent the nose bar from bowing inwardly, and a similar bearing block 22 is secured to the top wall 4a at the opposite end of the frame assembly 4 for engaging the medial portion of nose bar 17.

Figure 4:
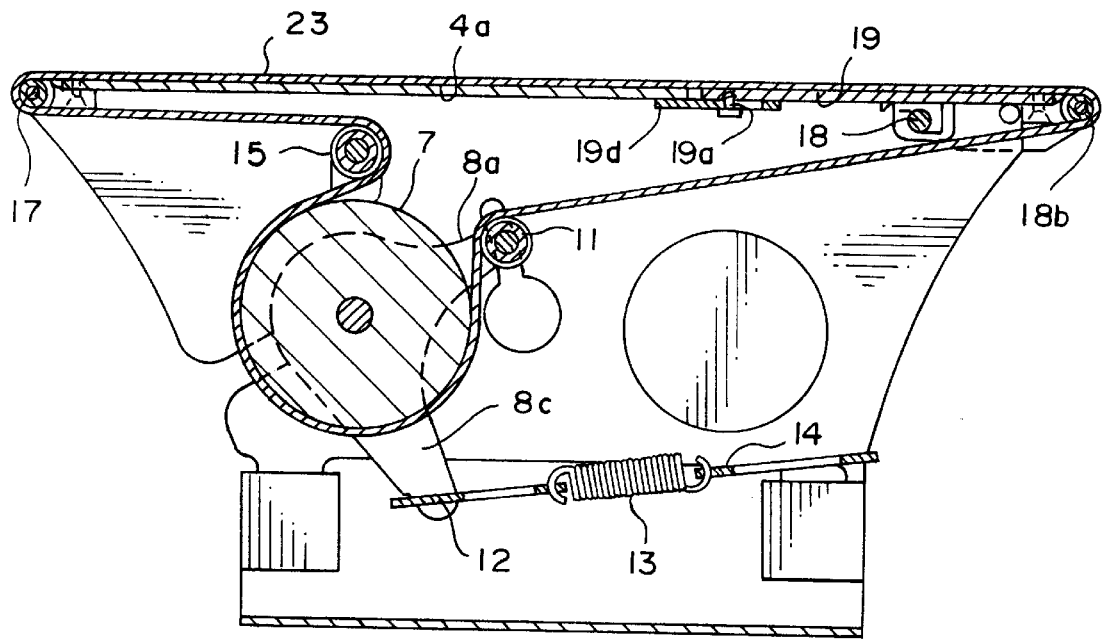
FIG. 4 is a view taken along line 4—4 of FIG. 3.
Figure 5:
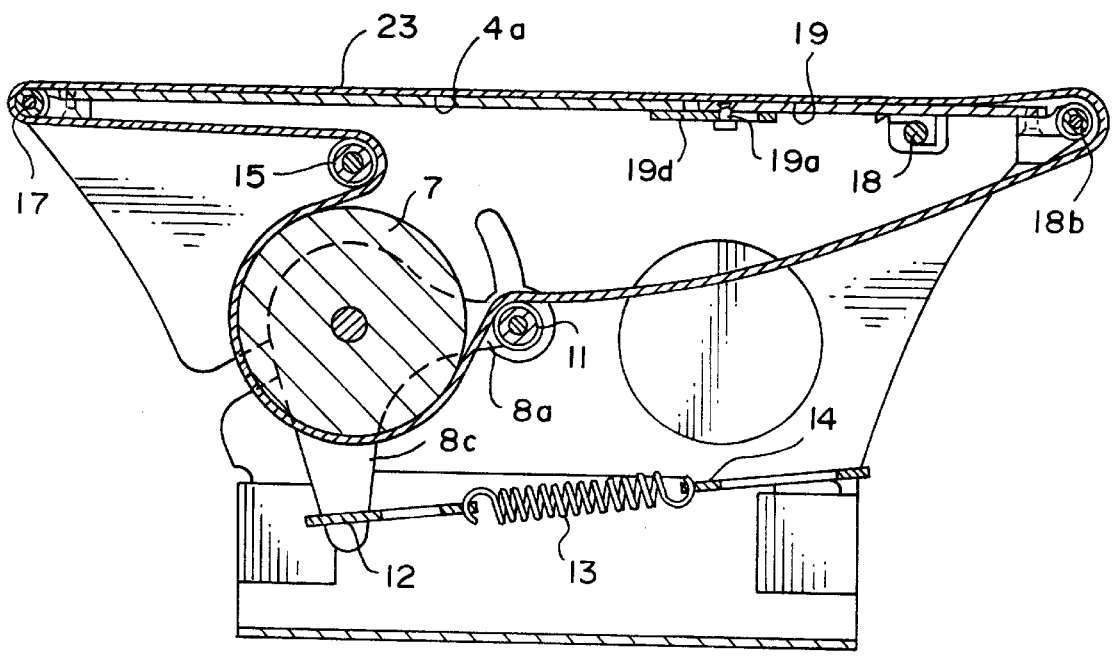
FIG. 5 is a side elevational view similar to FIG. 4 but showing the tension on the belt being released.
Figures 6, 7:
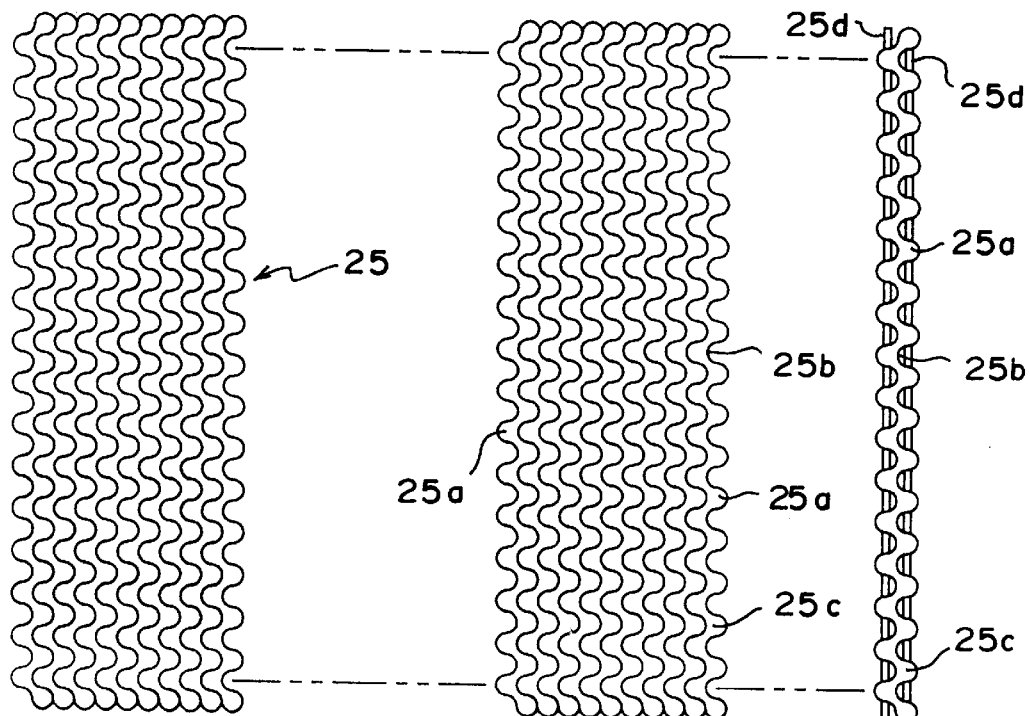
FIG. 6 is a top plan view of one embodiment of a plastic chain conveyor belt adapted for use on the transfer conveyor illustrated in FIGS. 1 to 5.
FIG. 7 is a fragmentary side elevational view showing the conveyor belt of FIG. 6 extending around a small diameter nose bar on the transfer conveyor illustrated in FIGS. 1 to 5.

As will be seen in FIGS. 4 and 5, a conveyor belt 23 extends along the top wall 4a of the frame assembly 4 and the top of plate member 19, around nose bars 17, 18, idler rollers 11 and 15, and drive roller 7 positioned therebetween. The tension of the spring 13 acting on finger portions 8c of the bifurcated arms 8 maintains the leg portions 8a and associated idler roller 11 in the upper position as shown in FIG. 4 to maintain the belt 23 in the taut, operative position.

To relieve the tension on the belt 23, the finger portions 8c are pivoted in a clockwise direction to overcome the tension of spring 13, whereby the leg portions 8a and associated idler roller 11 are moved to the lower position as shown in FIG. 5 to relieve the tension on the belt 23 so that it can be removed. By this construction and arrangement, no special tools are required for removing the belt for either cleaning or replacement.

The conveyor 1 is detachably connected to a base 24 having detente sockets 24a positioned at the four corners adapted to receive depending feet 4j in the side walls 4b and 4c.

To complete the structure of the transfer conveyor 1, a transversely extending rod 25 is fixedly mounted at each end to the upper portions of the side walls 4b and 4c in proximity to the nose bar 18 for maintaining the side walls in spaced relationship.

While the conveyor belt 23 can be made of fabric, such as canvas, FIGS. 6 to 9 illustrate other types of conveyor belts which can be employed with the transfer conveyor 1 of the present invention. The conveyor belt 25, shown in FIGS. 6 and 7 comprises a plurality of molded plastic links 25a having a sinusoidal edge configuration 25b and a flat top surface 25c. The links 25a are held in interdigitated relationship by transversely extending rods 25d extending through adjacent links 25a which are journalled on the rods 25d. By this construction and arrangement, a continuous flat surface is provided by the belt 25 for the transfer of products thereon.

Figures 8, 9:
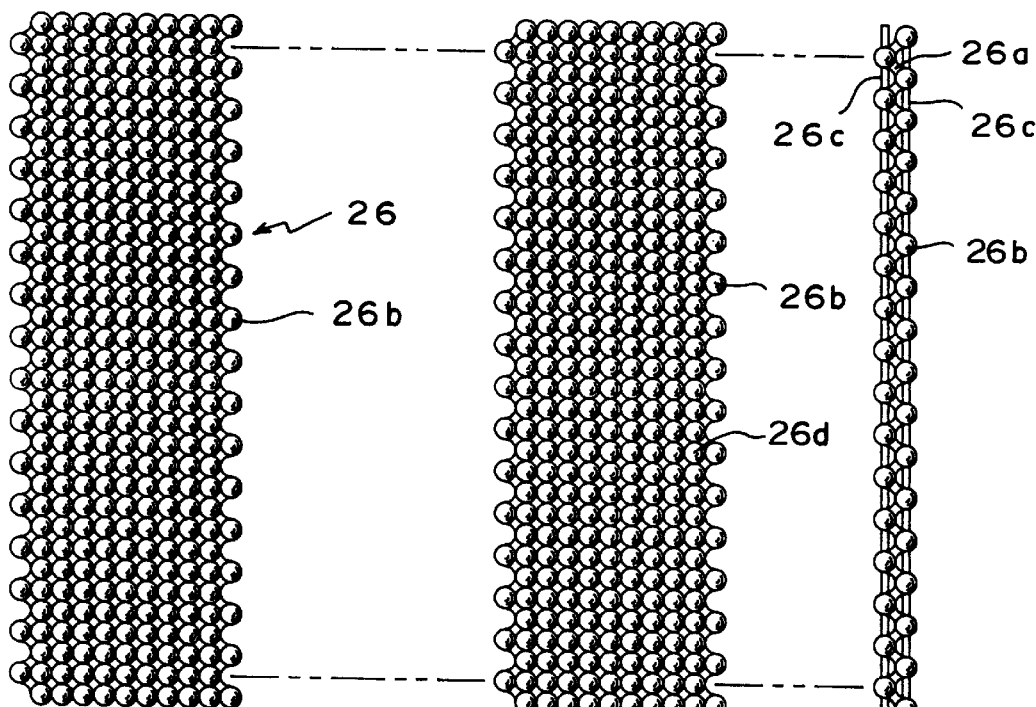
FIG. 8 is a top plan view of another embodiment of a plastic chain conveyor belt adapted for use on the transfer conveyor illustrated in FIGS. 1 to 5.
FIG. 9 is a fragmentary side elevational view showing the conveyor belt of FIG. 8 extending around a small diameter nose bar on the transfer conveyor illustrated in FIGS. 1 to 5.

Another embodiment of a molded plastic conveyor belt 26 is illustrated in FIGS. 8 and 9 wherein each plastic link 26a consists of a plurality of offset, laterally spaced, interconnected plastic beads or spherical members 26b. The links 26a are held in interdigitated relationship by transversely extending rods 26c extending through adjacent links 26a which are journalled on the rods 26c. By this construction and arrangement, a configured surface 26a is provided on the upper surface of the belt 26 to provide a friction surface thereon to facilitate holding products on the conveyor while being transferred.

The construction and arrangement of the plastic conveyor belts 25 and 26 also adapt them for use on the smooth surface drive roller 7; thus, not requiring a sprocket drive wheel as required in most link-type conveyor belts.

From the above description, it will be readily apparent to those skilled in the art that the conveyor of the present invention provides an improved transfer conveyor which can be readily disassembled for cleaning without requiring any special tools. The transfer conveyor belt can be quickly adjusted laterally for alignment with the product conveyor belts, and either fabric or plastic link belts can be employed.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. A transfer conveyor adapted to be positioned in the gap between the discharge end of one conveyor and the infeed end of another conveyor, comprising a frame assembly, a drive roller, having a shaft mounted in said frame assembly, means for driving said drive roller mounted in said frame assembly, a top wall on said frame assembly, a nose bar mounted at each end of said top wall, a pair of idler rollers mounted in said frame assembly, an endless belt extending along the top wall of said frame assembly, around the nose bars, idler rollers and drive roller, and a releasable tension assembly operatively connected between the frame assembly and one of the idler rollers whereby the tension on the endless belt can be relieved to facilitate removal of the belt from the nose bars, idler rollers, and drive roller.

2. A transfer conveyor according to claim 1 wherein the releasable tension assembly comprises at least one bifurcated arm pivotally mounted on the drive roller shaft, said arm having a leg portion and a finger portion, one of the idler rollers being mounted on said leg portion, and a tension spring connected between said finger portion and said frame assembly.

3. A transfer conveyor according to claim 1 wherein the top wall includes a fixed portion and a movable portion, said movable portion comprising a plate member, means for pivotally connecting said plate member to said fixed portion, and means operatively connected between said frame assembly and said plate member for manually shifting the plate member in a lateral direction for aligning the transfer conveyor belt with the conveyor belts on the first and second mentioned conveyors.

4. A transfer conveyor according to claim 1 wherein a base is provided, and means for detachably connecting said frame assembly to said base.

5. A transfer conveyor according to claim 1 wherein said endless belt is made of a fabric.

6. A transfer conveyor according to claim 1, wherein said endless belt is made of a plurality of molded plastic links.

7. A transfer conveyor according to claim 6, wherein each plastic link has a sinusoidal edge configuration and a flat top surface, said links being positioned in interdigitated relationship, and transversely extending rods extending through adjacent links for holding said links in said interdigitated relationship.

8. A transfer conveyor according to claim 6, wherein each plastic link comprises a plurality of offset, laterally spaced, interconnected plastic beads, said links being positioned in interdigitated relationship, and transversely extending rods extending through adjacent links for holding said links in said interdigitated relationship.

* * * * *